(12) United States Patent
Xu et al.

(10) Patent No.: US 10,053,638 B2
(45) Date of Patent: *Aug. 21, 2018

(54) PRODUCTION OF LOW CLOUD POINT DISTILLATE FUELS

(71) Applicant: ExxonMobil Research and Engineering Company, Annandale, NJ (US)

(72) Inventors: Xiaochun Xu, Annandale, NJ (US); William J. Novak, Bedminster, NJ (US); Timothy L. Hilbert, Fairfax, VA (US); Stephen J. McCarthy, Center Valley, PA (US)

(73) Assignee: EXXONMOBIL RESEARCH AND ENGINEERING COMPANY, Annandale, NJ (US)

(*) Notice: Subject to any disclaimer, the term of this patent is extended or adjusted under 35 U.S.C. 154(b) by 424 days.

This patent is subject to a terminal disclaimer.

(21) Appl. No.: 14/193,067

(22) Filed: Feb. 28, 2014

(65) Prior Publication Data

US 2014/0291202 A1 Oct. 2, 2014

Related U.S. Application Data

(60) Provisional application No. 61/806,606, filed on Mar. 29, 2013.

(51) Int. Cl.
*C10G 65/00* (2006.01)
*C10G 65/12* (2006.01)
(Continued)

(52) U.S. Cl.
CPC .......... *C10G 65/12* (2013.01); *B01J 29/7461* (2013.01); *B01J 29/7492* (2013.01);
(Continued)

(58) Field of Classification Search
CPC ...... C10G 45/62; C10G 45/64; C10G 65/043; C10G 65/12; C10G 2300/1048;
(Continued)

(56) References Cited

U.S. PATENT DOCUMENTS 5,951,848 A * 9/1999 Baker, Jr. ............. C10G 65/043
208/143
6,190,532 B1 * 2/2001 Degnan .................... B01J 29/86
208/18

(Continued)

FOREIGN PATENT DOCUMENTS

EP 1063014 A2 12/2000

OTHER PUBLICATIONS

A. deLucas, P. Sanchez, F. Dorado, M.J. Ramos and J.L. Valverde, "Effect of the metal loading in the hydroisomerization of n-octane over beta agglomerated zeolite based catalysts", Applied Catalysis A: General, vol. 294, No. 2, Oct. 10, 2005, pp. 215-225.

(Continued)

*Primary Examiner* — Prem C Singh
*Assistant Examiner* — Brandi M Doyle
(74) *Attorney, Agent, or Firm* — Andrew I. Ward; Amanda K. Jenkins

(57) ABSTRACT

Methods are provided for dewaxing a distillate fuel boiling range feed to improve one or more cold flow properties of the distillate fuel feed, such as cloud point, with reduced consumption of hydrogen during the dewaxing process. The reduced hydrogen consumption is achieved by using a dewaxing catalyst with a reduced content of hydrogenation metals, such as a content of Pt or Pd of from about 0.03 wt % to about 0.35 wt %. A distillate fuel feed can be dewaxed to achieve a desired cloud point differential using a reduced (Continued)

metals content dewaxing catalyst under the same or similar conditions to those required for a dewaxing catalyst with higher metals content.

10 Claims, 2 Drawing Sheets

(51) Int. Cl.
    *C10G 45/62*     (2006.01)
    *C10G 65/04*     (2006.01)
    *C10G 45/64*     (2006.01)
    *B01J 29/74*     (2006.01)
    *B01J 35/10*     (2006.01)

(52) U.S. Cl.
    CPC .......... *B01J 35/1004* (2013.01); *C10G 45/62* (2013.01); *C10G 45/64* (2013.01); *C10G 65/043* (2013.01); *B01J 2229/42* (2013.01); *C10G 2300/1048* (2013.01); *C10G 2300/304* (2013.01); *C10G 2400/04* (2013.01)

(58) Field of Classification Search
    CPC ........... C10G 2300/304; C10G 2400/04; B01J 29/7461; B01J 29/7492; B01J 35/1004; B01J 2229/42
    See application file for complete search history.

(56) References Cited

U.S. PATENT DOCUMENTS

| | | | |
|---|---|---|---|
| 8,263,519 B2 | 9/2012 | Elia et al. | |
| 8,303,804 B2 | 11/2012 | Helton et al. | |
| 8,377,286 B2 | 2/2013 | Oliveri et al. | |
| 2005/0092651 A1* | 5/2005 | Zones | B01J 29/70 208/27 |
| 2009/0127165 A1* | 5/2009 | Eijsbouts-Spickova | B01J 23/002 208/216 R |
| 2010/0084313 A1* | 4/2010 | Helton | C10G 3/00 208/60 |
| 2011/0315599 A1* | 12/2011 | Prentice | C10G 45/06 208/66 |
| 2012/0004477 A1 | 1/2012 | Dougherty et al. | |

OTHER PUBLICATIONS

PCT Application No. PCT/S2014/019224, Communication from the International Searching Authority (International Search Report), Form PCT/ISA/220, dated Jul. 11, 2014, 5 pages.

PCT Application No. PCT/US2014/019224, Communication from the International Searching Authority (Written Opinion), Form PCT/ISA/237, dated Jul. 11, 2014, 8 pages.

* cited by examiner

PRODUCTION OF LOW CLOUD POINT DISTILLATE FUELS

CROSS-REFERENCE TO RELATED APPLICATIONS

This application claims priority to U.S. Provisional Application Ser. No. 61/806,606 filed Mar. 29, 2013, which is herein incorporated by reference in its entirety.

FIELD

This invention provides methods for producing distillate fuels with improved cold flow properties while reducing hydrogen consumption.

BACKGROUND

In diesel hydroprocessing, it is sometimes beneficial to include a dewaxing stage as part of reaction train in order to improve properties of the resulting diesel fuel such as pour point or cloud point. Such improvements in cold flow properties can, for example, allow a diesel fuel to meet a desired specification for a diesel fuel pool, or the improvements can allow a diesel fuel to be suitable for a higher value use, such as use as a winter diesel fuel. While such improvements can be desirable, performing an additional dewaxing process on a diesel fuel product typically means that additional refinery resources are consumed in order to perform the process.

U.S. Pat. No. 8,377,286 describes hydroprocessing methods for diesel fuel production. The methods include options for processing diesel fuel under sour conditions, such as in the presence of 100 wppm or more of sulfur. The dewaxing catalysts used for dewaxing of the diesel fuel include catalysts with a relatively low surface area, such as catalysts with a ratio of zeolite surface area to external surface area of at least about 80:100. The dewaxing catalysts are described as having a hydrogenation metals content of at least 0.1 wt %.

U.S. Pat. No. 8,303,804 describes hydroprocessing methods for production of jet fuels. The methods can include exposing a kerosene boiling range feedstock to a 10-member ring zeolite catalyst that also includes 0.1 wt % of a metal hydrogenation component.

U.S. Pat. No. 8,263,519 describes dewaxing catalysts that do not include a metal hydrogenation component or that include less than 0.05 wt % of a metal hydrogenation component. The dewaxing catalysts have include catalysts with a relatively low surface area, such as catalysts with a ratio of zeolite surface area to external surface area of at least about 80:100.

SUMMARY

In an embodiment, a method for producing distillate fuel products is provided. The method includes exposing a distillate fuel boiling range feedstock to a dewaxing catalyst comprising a molecular sieve and a metal hydrogenation component under effective dewaxing conditions to produce a dewaxed effluent having a cloud point that is reduced relative to a cloud point of the feedstock by at least about 10° F., the dewaxing catalyst having an amount of metal hydrogenation component comprising about 0.03 wt % to about 0.35 wt %, or about 0.05 wt % to about 0.35 wt % of a Group VIII noble metal, wherein an amount of cloud point reduction for the dewaxed effluent is within 10% of a cloud point reduction for an effluent formed when the feedstock is exposed, under the effective dewaxing conditions, to a dewaxing catalyst comprising the molecular sieve and at least about twice the amount of metal hydrogenation component. Optionally, the feedstock can be hydrotreated prior to exposing the feedstock to the dewaxing catalyst.

DETAILED DESCRIPTION

Overview

In various aspects, methods are provided for dewaxing a distillate fuel boiling range feed to improve one or more cold flow properties of the distillate fuel feed, such as cloud point. The dewaxing of the distillate feed can be performed using a dewaxing catalyst that allows for a reduced consumption of hydrogen during the dewaxing process. The reduced hydrogen consumption is achieved at least in part by using a dewaxing catalyst with a reduced content of hydrogenation metals, such as a content of Pt or Pd of from about 0.03 wt % to about 0.35 wt %, or about 0.05 wt % to about 0.35 wt %. In some aspects, a distillate fuel feed can be dewaxed to achieve a desired cloud point differential using a reduced metals content dewaxing catalyst under the same or similar conditions to those required for a dewaxing catalyst with higher metals content while unexpectedly consuming less hydrogen than the corresponding process for the higher metals content dewaxing catalyst.

Figure 1:
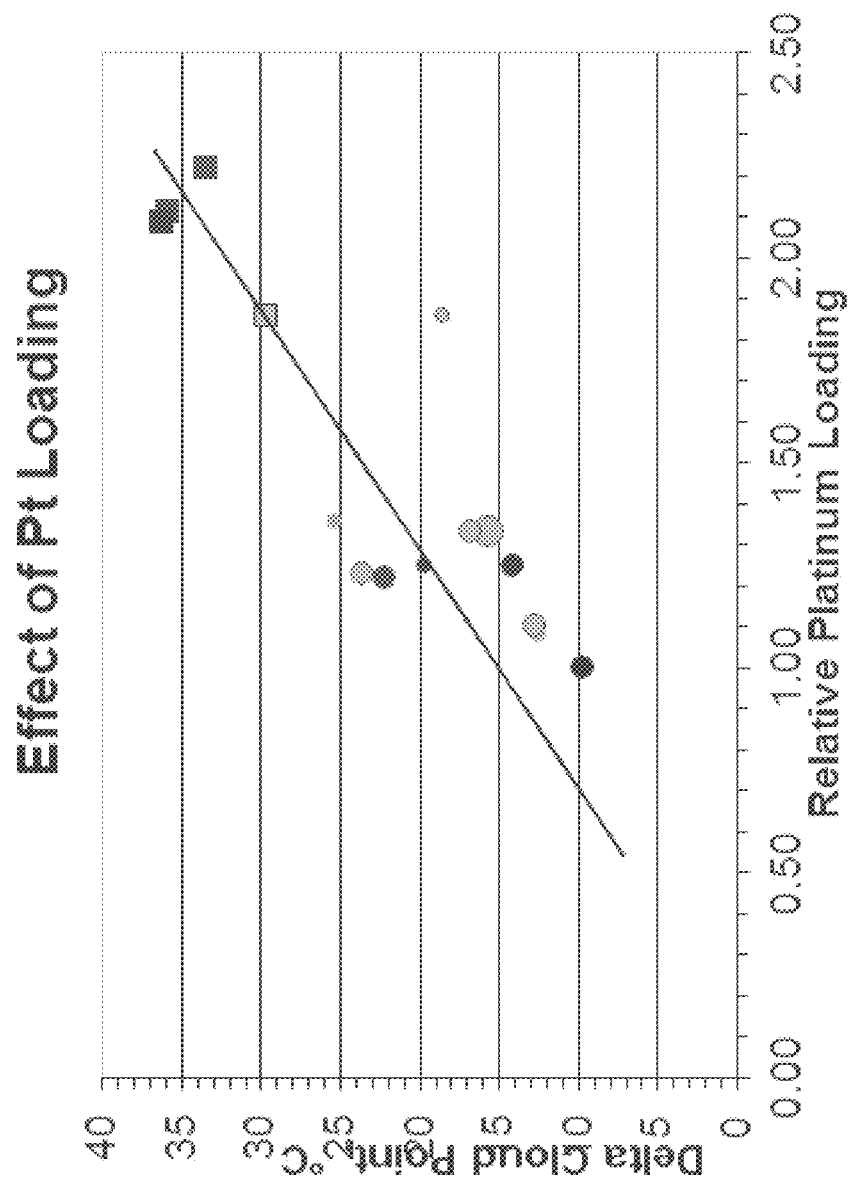
FIG. 1 shows an example of the dependence of dewaxing catalyst activity for cloud point reduction relative to metals content.

FIG. 1 shows an example of the expected relationship for how the metals content of a dewaxing catalyst impacts the amount of cloud point differential. In FIG. 1, a variety of dewaxing catalysts with varying metals content were used to dewax a distillate fuel feed under a fixed set of conditions. The dewaxing catalyst shown in FIG. 1 corresponds to an alumina-bound ZSM-48 catalyst with a silica to alumina ratio between about 70 to about 110, with various amounts of Pt supported on the catalyst. For ease of comparison, a metals content of 0.6 wt % Pt supported on the dewaxing catalyst was selected as a baseline amount of metal. The amount of supported metals (Pt) on the other catalysts in FIG. 1 is shown as a relative ratio to the baseline amount.

For the data in FIG. 1, the feed was a commercially generated diesel fuel that was spiked with 3000 wppm of sulfur using DMDS and 50 wppm of nitrogen using aniline. The spiked diesel fuel was exposed to the dewaxing catalyst at a liquid hourly space velocity of about 1.8 hr$^{-1}$, an $H_2$ pressure of about 800 psig (5.5 MPag), and an ($H_2$) treat gas flow rate of about 2000 scf/b (337 Nm$^3$/m$^3$).

As shown in FIG. 1, the amount of cloud point reduction achieved has an approximately linear relationship with the amount of hydrogenation metal supported on the dewaxing catalyst. At lower values of metal content, such as near 0.6 wt % Pt or 1.0 for the relative ratio on the x-axis, the cloud point differentials shown in FIG. 1 are slightly below the curve fit to all of the data. However, even for the lower metals content data points, the linear relationship between metals content and cloud point differential is readily apparent. This demonstrates that performing dewaxing on a distillate fuel feed in the presence of a dewaxing catalyst with a reduced metals content would be expected to result in a smaller cloud point differential as compared to performing dewaxing under similar conditions with a higher metals content catalyst.

In contrast to the trend shown in FIG. 1, it has been unexpectedly found that a dewaxing catalyst with a hydrogenation metal content of about 0.35 wt % or less, such as about 0.30 wt % or less, can be used to achieve the same cloud point reduction as a higher metals content dewaxing catalyst under similar processing conditions. In addition to requiring a lower metal content, the dewaxing catalyst with a metal content of about 0.35 wt % or less, such as about 0.30 wt % or less, also consumes less hydrogen while achieving the same cloud point reduction. Without being bound by any particular theory, it is believed that the reduced hydrogen consumption is due to the lower metal content dewaxing catalyst performing less aromatic saturation of the distillate fuel feedstock.

Feedstocks

In some aspects, a distillate fuel boiling range feedstock can have an initial boiling point of at least about 200° F. (93° C.), or at least about 250° F. (121° C.), or at least about 300° F. (149° C.), or at least about 350° F. (177° C.), or at least about 400° F. (204° C.), or at least about 450° F. (232° C.). The initial boiling point can vary widely, depending on how much kerosene or other lighter distillate components are included in a feedstock. In another embodiment, the feedstock can have a final boiling point of about 800° F. (427° C.) or less, or about 700° F. (371° C.) or less, or about 650° F. (343° C.) or less. Another way of characterizing a feedstock is based on the boiling point required to boil a specified percentage of the feed. For example, the temperature required to boil at least 5 wt % of a feed is referred to as a "T5" boiling point. When characterizing a feed based on a T5 boiling point, the feedstock can have a T5 boiling point at least about 200° F. (93° C.), or at least about 250° F. (121° C.), or at least about 300° F. (149° C.), or at least about 350° F. (177° C.), or at least about 400° F. (204° C.), or at least about 450° F. (232° C.). In some aspects, the feedstock can correspond to a diesel boiling range feedstock that has a T5 boiling point of at least about 350° F. (177° C.), such as at least about 370° F. (188° C.), or at least about 400° F. (204° C.), or at least about 450° F. (232° C.). In another aspect, the feed can have a T95 boiling point of about 800° F. (427° C.) or less, or about 750° F. (399° C.) or less, or about 700° F. (371° C.) or less, or about 650° F. (343° C.) or less. The boiling point for a feed at a given weight percentage can be determined by any convenient method, such as the method specified in D2887.

In some aspects, the feedstock generally comprises a mineral oil. By "mineral oil" is meant a fossil/mineral fuel source, such as crude oil, and not the commercial organic product, such as sold under the CAS number 8020-83-5, e.g., by Aldrich. Examples of mineral oils can include, but are not limited to, straight run (atmospheric) gas oils, demetallized oils, coker distillates, cat cracker distillates, heavy naphthas, diesel boiling range distillate fraction, jet fuel boiling range distillate fraction, and/or kerosene boiling range distillate fractions. The mineral oil portion of the feedstock can comprise any one of these example streams or any combination thereof. Preferably, the feedstock does not contain any appreciable asphaltenes.

Mineral feedstreams suitable for use in various embodiments can have a nitrogen content from about 10 wppm to about 6000 wppm nitrogen, such as at least about 50 wppm or at least about 100 wppm and/or about 2000 wppm or less or about 1000 wppm or less. In an embodiment, feedstreams suitable for use herein can have a sulfur content from about 10 wppm to about 40,000 wppm sulfur, such as about 100 wppm to about 30,000 wppm, or about 250 wppm to about 25,000 wppm. Depending on the aspect, a feed can be hydrotreated prior to dewaxing to reduce the amount of sulfur and/or nitrogen content that a dewaxing catalyst is exposed to. In such embodiments, performing a separation between the hydrotreating and dewaxing stages may be desirable. Either with or without such hydrotreating, in some aspects the sulfur content of a distillate fuel boiling range feedstock can be about 5000 wppm or less, such as about 1000 wppm or less, or about 500 wppm or less, or about 400 wppm or less, or about 100 wppm or less. In such aspects, the nitrogen content of the distillate fuel boiling range feedstock can be about 500 wppm or less, such as about 100 wppm or less, or about 65 wppm or less, or about 50 wppm or less.

A distillate fuel boiling range feed can typically have an aromatics content of at least about 3 wt %, such as at least about 5 wt %, or at least about 10 wt %. By reducing or minimizing the amount of additional saturation of such aromatics that is performed during dewaxing, the amount of hydrogen consumed during dewaxing can be reduced.

In various aspects of the invention, the feed can also include portions of the feed that are from biocomponent sources. The feed can include varying amounts of feedstreams based on biocomponent sources, such as vegetable oils, animal fats, fish oils, algae oils, etc. For a biocomponent feed that has been previously hydroprocessed or that is otherwise compatible with conventional refinery equipment, the feed could potentially be entirely derived from a biocomponent source. More typically, the feed can include at least 0.1 wt % of feed based on a biocomponent source, or at least 0.5 wt %, or at least 1 wt %, or at least 3 wt %, or at least 10 wt %, or at least 15 wt %. In such embodiments, the feed can include 90 wt % or less of a feed based on a biocomponent source, or 60 wt % or less, or 40 wt % or less, or 20 wt % or less. In other embodiments, the amount of co-processing can be small, with a feed that includes at least 0.5 wt % of feedstock based on a biocomponent source, or at least 1 wt %, or at least 2.5 wt %, or at least 5 wt %. In such an embodiment, the feed can include 20 wt % or less of biocomponent based feedstock, or 15 wt % or less, or 10 wt % or less, or 5 wt % or less.

In this discussion, a biocomponent feed or feedstock refers to a hydrocarbon feedstock derived from a biological raw material component, such as vegetable fats/oils or animal fats/oils, fish oils, pyrolysis oils, and algae lipids/oils, as well as components of such materials, and in some embodiments can specifically include one or more types of lipid compounds. A biocomponent portion of a feed can be a portion that has been previously hydroprocessed, a portion that has not been previously hydroprocessed, or a combination thereof.

Catalyst for Distillate Fuel Dewaxing

In some aspects, catalytic dewaxing with a low metals content dewaxing catalyst can be accomplished by selective hydrocracking and/or by isomerizing long chain molecules within a feed such as a diesel range feed. Dewaxing catalysts can be selected from molecular sieves such as crystalline aluminosilicates (zeolites) or silico-aluminophosphates (SAPOs). In an embodiment, the molecular sieve can be a 1-D or 3-D molecular sieve. In an embodiment, the molecular sieve can be a 10-member ring 1-D molecular sieve. Examples of molecular sieves can include ZSM-48, ZSM-23, ZSM-35, and combinations thereof. In an embodiment, the molecular sieve can be ZSM-48, ZSM-23, or a combination thereof. Still other suitable molecular sieves can include SSZ-32, EU-2, EU-11, and/or ZBM-30.

Optionally, the dewaxing catalyst can include a binder for the molecular sieve, such as alumina, titania, silica, silica-alumina, zirconia, or a combination thereof. In a preferred embodiment, the binder can be alumina. In another embodiment, the binder can be alumina, titania, or a combination thereof. In still another embodiment, the binder can be titania, silica, zirconia, or a combination thereof. Optionally, the binder can correspond to a binder with a relatively high surface area. One way to characterize the surface of the binder is in relation to the surface area of the molecular sieve in the dewaxing catalyst. For example, the ratio of molecular sieve surface area to binder surface can be about 80 to 100 or less, such as about 70 to 100 or less or about 60 to 100 or less.

One feature of molecular sieves that can impact the activity of the molecular sieve is the ratio of silica to alumina in the molecular sieve. In an embodiment where the molecular sieve is ZSM-48, the molecular sieve can have a silica to alumina ratio of about 110 to 1 or less, such as about 100 to 1 or less, and preferably about 90 to 1 or less, such as about 80 to 1 or less. When the molecular sieve is ZSM-48, the molecular sieve preferably has a silica to alumina ratio of at least about 70 to 1.

The dewaxing catalyst can also include a metal hydrogenation component, such as a Group VIII metal (Groups 8-10 of IUPAC periodic table). Suitable Group VIII metals can include Pt, Pd, or Ni. Preferably the Group VIII metal is a noble metal, such as Pt, Pd, or a combination thereof. The dewaxing catalyst can include at least about 0.03 wt % of a Group VIII metal, such as at least about 0.05 wt %, or preferably at least about 0.1 wt %. Additionally or alternately, the dewaxing catalyst can include about 0.35 wt % or less of a Group VIII metal, such as about 0.30 wt % or less. Preferably, the dewaxing catalyst includes from about 0.03 wt % to about 0.35 wt % of a Group VIII metal, alternatively from about 0.05 wt % to about 0.35 wt % of a Group VIII metal, or alternatively from about 0.10 wt % to about 0.30 wt % of a Group VIII metal.

Catalytic dewaxing can be performed by exposing a feedstock to a dewaxing catalyst under effective (catalytic) dewaxing conditions. Effective dewaxing conditions can include a temperature of at least about 500° F. (260° C.), or at least about 550° F. (288° C.), or at least about 600° F. (316° C.), or at least about 650° F. (343° C.). Alternatively, the temperature can be about 750° F. (399° C.) or less, or about 700° F. (371° C.) or less, or about 650° F. (343° C.) or less. The pressure can be at least about 200 psig (1.4 MPa), or at least about 500 psig (3.4 MPa), or at least about 750 psig (5.2 MPa), or at least about 1000 psig (6.9 MPa). Alternatively, the pressure can be about 1500 psig (10.3 MPa) or less, or about 1200 psig (8.2 MPa) or less, or about 1000 psig (6.9 MPa) or less, or about 800 psig (5.5 MPa) or less. The Liquid Hourly Space Velocity (LHSV) can be at least about 0.5 hr$^{-1}$, or at least about 1.0 hr$^{-1}$, or at least about 1.5 hr$^{-1}$. Alternatively, the LHSV can be about 5.0 hr$^{-1}$ or less, or about 3.0 hr$^{-1}$ or less, or about 2.0 hr$^{-1}$ or less. The treat gas rate can be at least about 500 scf/bbl (84 m$^3$/m$^3$), at least about 750 scf/bbl (126 m$^3$/m$^3$), or at least about 1000 scf/bbl (169 m$^3$/m$^3$). Alternatively, the treat gas rate can be about 4000 scf/bbl (674 m$^3$/m$^3$) or less, or about 2000 scf/bbl (337 m$^3$/m$^3$) or less, or about 1500 scf/bbl (253 m$^3$/m$^3$) or less, or about 1250 scf/bbl (211 m$^3$/m$^3$) or less.

Based on dewaxing under effective catalytic dewaxing conditions, the cloud point of a dewaxed distillate fuel fraction can be reduced relative to the feedstock by at least about 10° F. (5° C.), such as at least about 20° F. (11° C.), or at least about 30° F. (17° C.). Additionally or alternately, in an aspect where the feedstock is hydrotreated prior to dewaxing, the cloud point of a dewaxed distillate fuel fraction can be reduced relative to the hydrotreated effluent by at least about 10° F. (5° C.), such as at least about 20° F. (11° C.), or at least about 30° F. (17° C.). The amount of cloud point reduction can depend on a variety of factors, including the sulfur content of the feedstock, the nitrogen content of the feedstock, and the selected effective dewaxing conditions.

In various aspects, the amount of cloud point reduction for a dewaxing catalyst having 0.35 wt % or less of metal hydrogenation component can be within 10% of the amount of cloud point reduction produced when the same feedstock is exposed to a dewaxing catalyst comprising the same molecular sieve under substantially the same dewaxing conditions, but at least twice the amount of metal hydrogenation component. In other words, if the catalyst with at least twice as much metal produces a cloud point reduction of 20° F. in the dewaxed feedstock, then the catalyst having 0.35 wt % or less of metal hydrogenation component with produce a cloud point reduction of at least about 18° F. Unexpectedly, the catalyst having 0.35 wt % or less of metal hydrogenation component consume less hydrogen while achieving the same or a similar cloud point reduction. For example, the hydrogen consumption for the catalyst having 0.35 wt % or less of metal hydrogenation component can be at least about 5% lower than the consumption for the dewaxing catalyst having at least twice the metal hydrogenation component, such as at least about 7.5% lower, or at least about 10% lower.

Hydrotreatment and/or Hydrofinishing

Optionally, the feedstock can be treated in one or more hydrotreatment stages prior to dewaxing. The reaction conditions in a hydrotreatment stage can be conditions suitable for reducing the sulfur content of the feedstream. The reaction conditions can include an LHSV of 0.3 to 5.0 hr$^{-1}$, a total pressure from about 200 psig (1.4 MPag) to about 3000 psig (20.7 MPa), a treat gas containing at least about 80% hydrogen (remainder inert gas), and a temperature of from about 500° F. (260° C.) to about 800° F. (427° C.). Preferably, the reaction conditions include an LHSV of from about 0.5 to about 1.5 hr$^{-1}$, a total pressure from about 700 psig (4.8 MPa) to about 2000 psig (13.8 MPa), and a temperature of from about 600° F. (316° C.) to about 700° F. (399° C.). The treat gas rate can be from about 500 SCF/B (84 Nm$^3$/m$^3$) to about 10000 SCF/B (1685 Nm$^3$/m$^3$) of hydrogen, depending on various factors including the nature of the feed being hydrotreated. Note that the above treat gas rates refer to the rate of hydrogen flow. If hydrogen is delivered as part of a gas stream having less than 100% hydrogen, the treat gas rate for the overall gas stream can be proportionally higher.

In some aspects of the invention, the hydrotreatment stage(s) can reduce the sulfur content of the feed to a suitable level. For example, the sulfur content can be reduced sufficiently so that the feed into the dewaxing stage can have about 500 wppm sulfur or less, or about 250 wppm or less, or about 100 wppm or less, or about 50 wppm or less. Additionally or alternately, the sulfur content of the feed to the dewaxing stage can be at least about 1 wppm sulfur, or at least about 5 wppm, or at least about 10 wppm. Additionally or alternately, the sulfur content of the hydrotreated effluent can correspond to any of the other sulfur values noted above.

The catalyst in a hydrotreatment stage can be a conventional hydrotreating catalyst, such as a catalyst composed of a Group VIB metal (Group 6 of IUPAC periodic table) and/or a Group VIII metal (Groups 8-10 of IUPAC periodic table) on a support. Suitable metals include cobalt, nickel, molybdenum, tungsten, or combinations thereof. Preferred combinations of metals include nickel and molybdenum or nickel, cobalt, and molybdenum. Suitable supports include silica, silica-alumina, alumina, and titania.

After hydrotreatment, the hydrotreated effluent can optionally but preferably be separated, such as by separating the gas phase effluent from a liquid phase effluent, in order to remove gas phase contaminants generated during hydrotreatment. Alternatively, in some aspects the entire hydrotreated effluent can be cascaded into the catalytic dewaxing stage(s).

Optionally, a hydrofinishing stage can also be included after the catalytic dewaxing stage(s), such as in the final catalytic dewaxing reactor or in a separate reactor. Hydrofinishing catalysts can include catalysts containing Group VI metals, Group VIII metals, and mixtures thereof. In an embodiment, preferred metals include at least one metal sulfide having a strong hydrogenation function. In another embodiment, the hydrofinishing catalyst can include a Group VIII noble metal, such as Pt, Pd, or a combination thereof. The mixture of metals may also be present as bulk metal catalysts wherein the amount of metal is about 30 wt. % or greater based on catalyst. Suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as about 20 weight percent for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41.

Hydrofinishing conditions can include temperatures from about 125° C. to about 425° C., or about 180° C. to about 280° C., a total pressure from about 200 psig (1.4 MPa) to about 800 psig (5.5 MPa), or about 400 psig (2.8 MPa) to about 700 psig (4.8 MPa), and a liquid hourly space velocity from about 0.1 hr$^{-1}$ to about 5 hr$^{-1}$ LHSV, preferably about 0.5 hr$^{-1}$ to about 1.5 hr$^{-1}$. The treat gas rate can be selected to be similar to a catalytic dewaxing stage, similar to a hydrotreatment stage, or any other convenient selection.

Sample Configurations

Figure 2:
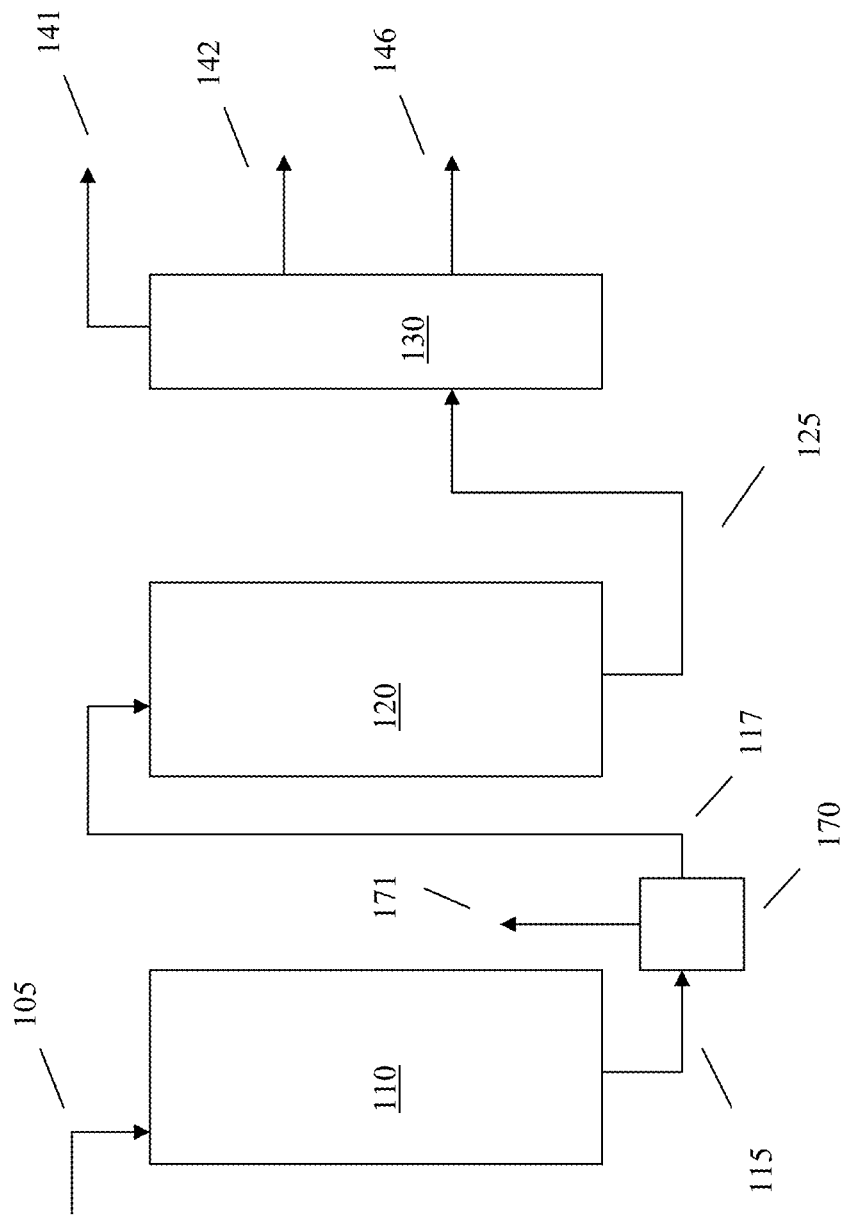
FIG. 2 schematically shows an example of a reaction system suitable for performing an embodiment of the invention.

FIG. 2 shows an example of a two stage reaction system for producing a diesel product. In FIG. 2, a suitable feed 105 for forming a distillate fuel boiling range product (such as a diesel boiling range product) is passed into a hydrotreatment reactor 110. A separate hydrogen feed (not shown) can also be introduced into the reactor, or hydrogen can be introduced along with the feed. The feed 105 is hydrotreated in the reactor 110 under effective hydrotreating conditions to reduce the sulfur and/or nitrogen content of the feed to a desired level. The hydrotreated effluent 115 is then passed through a separation stage 170, such as a stripper or a gas-liquid separation stage, in order to separate gas phase products 171 (such as contaminant gases generated during hydrotreatment) from the hydrotreated liquid effluent 117. The hydrotreated liquid effluent 117 is then passed into dewaxing stage 120. The dewaxing stage is operated under conditions effective for producing a dewaxed effluent with a cloud point that is reduced relative to the initial feedstock by at least about 10° F., such as at least about 20° F. or at least about 30° F. The dewaxed effluent 125 is then sent to fractionator 130. The fractionator 130 generates a light ends fraction 141, one or more naphtha fractions 142, and at least one distillate fuel fraction, such as a diesel fraction 146. In the embodiment shown in FIG. 2, only a single diesel fraction 146 is shown. Alternatively, multiple distillate fuel fractions can be formed.

Examples 1-5: Dewaxing of Distillate Fuel Boiling Range Feedstocks

A series of runs were performed to dewax a diesel boiling range feedstock using dewaxing catalysts with a hydrogenation metal content of 0.3 wt % and 0.6 wt %, respectively, to demonstrate the benefits of dewaxing with lower metal content. In these examples, the dewaxing catalyst used was an alumina-bound ZSM-48 catalyst with a Pt content of either 0.3 wt % or 0.6 wt %. The ZSM-48 has a silica to alumina ratio of about 70:1 to 90:1.

Example 1—Feedstock

The properties of the feedstock used in the examples are shown in Table 1.

TABLE 1

| Feed Properties | |
|---|---|
| SimDis (D2887) | Feed ° F. |
| 0.5% | 237.9 |
| 5.0% | 371.5 |
| 10.0% | 417.8 |
| 20.0% | 467.4 |
| 30.0% | 504.3 |
| 40.0% | 535.2 |
| 50.0% | 563.2 |
| 60.0% | 588.1 |
| 70.0% | 614.5 |
| 80.0% | 646.1 |
| 90.0% | 682.4 |
| 95.0% | 709.4 |
| 99.5% | 778.2 |
| Naphtha (IBP-300° F.), wt % | 1.67 |
| Jet (300-500° F.), wt % | 27.17 |
| Diesel (500+° F.), wt % | 71.16 |
| API gravity | 35.96 |
| H Content, wt % | 13.38 |
| C Content, wt % | 86.61 |
| Cloud Point, G2500, ° F. | 21 |

In Examples 2-5, the sulfur content of the feedstock was about 10 wppm. In Example 6, the sulfur content was about 400 wppm. The nitrogen content of the feed was about 47 wppm. In these examples, the total pressure in the reactor is approximately the hydrogen partial pressure.

Example 2

Table 2 shows the processing conditions and results for the dewaxing reaction performed in Example 2.

TABLE 2

Processing conditions and results for Example 2

|  | Feed | 0.3 wt % Pt on ZSM-48 | 0.6 wt % Pt on ZSM-48 |
|---|---|---|---|
| Temperature, ° F. |  | 600 | 601 |
| LHSV, hr$^{-1}$ |  | 3 | 3 |
| Pressure, psig |  | 1000 | 1000 |
| Treat Gas, SCF/B |  | 2000 | 2000 |
| H Consumption, SCF/B |  | 407 | 438 |
| Cloud Point Improvement, ° F. |  | 10 | 10 |
| Naphtha (IBP-300° F.), wt % | 1.67 | 2.16 | 2.14 |
| Jet (300-500° F.), wt % | 27.17 | 31.58 | 31.69 |
| Diesel (500+° F.), wt % | 71.16 | 66.26 | 66.17 |

As shown in Table 2, at a temperature of 600° F. (316° C.) and a total pressure of 1000 psig (6.9 MPag), the dewaxing catalyst with the lower metals content produced roughly the same cloud point improvement of 10° F. (6° C.) as the cloud point improvement for the higher metals content catalyst under the same conditions. The product yields for the two catalysts were also similar. However, the hydrogen consumption for the lower metal catalyst is lower by about 7% (30 scf/B). In many refinery settings, the amount of available hydrogen generated by the refinery is constrained, and therefore any savings in hydrogen consumption can correspond to a reduction in the amount of outside hydrogen that must be brought in to operate the refinery processes.

Example 3

Table 3 shows the processing conditions and results for the dewaxing reaction performed in Example 3.

TABLE 3

Processing conditions and results for Example 3

|  | Feed | 0.3 wt % Pt on ZSM-48 | 0.6 wt % Pt on ZSM-48 |
|---|---|---|---|
| Temperature, ° F. |  | 630 | 631 |
| LHSV, hr$^{-1}$ |  | 6 | 6 |
| Pressure, psig |  | 1000 | 1000 |
| Treat Gas, SCF/B |  | 2000 | 2000 |
| H Consumption, SCF/B |  | 435 | 465 |
| Cloud Point Improvement, ° F. |  | 19 | 20 |
| Naphtha (IBP-300° F.), wt % | 1.67 | 2.26 | 2.23 |
| Jet (300-500° F.), wt % | 27.17 | 32.50 | 32.71 |
| Diesel (500+° F.), wt % | 71.16 | 65.24 | 65.05 |

As shown in Table 3, at a temperature of 630° F. (332° C.), a total pressure of 1000 psig (6.9 MPag), and an increased space velocity, the dewaxing catalyst with the lower metals content produced roughly the same cloud point improvement of about 20° F. (11° C.) as the cloud point improvement for the higher metals content catalyst under the same conditions. The product yields for the two catalysts were also similar. However, the hydrogen consumption for the lower metal catalyst is lower by about 7% (30 scf/B). Thus a similar benefit in reduced hydrogen consumption can be achieved at a higher temperature condition.

Example 4

Table 4 shows the processing conditions and results for the dewaxing reaction performed in Example 4.

TABLE 4

Processing conditions and results for Example 4

|  | Feed | 0.3 wt % Pt on ZSM-48 | 0.6 wt % Pt on ZSM-48 |
|---|---|---|---|
| Temperature, ° F. |  | 629 | 630 |
| LHSV, hr$^{-1}$ |  | 3 | 3 |
| Pressure, psig |  | 600 | 600 |
| Treat Gas, SCF/B |  | 2000 | 2000 |
| H Consumption, SCF/B |  | 349 | 401 |
| Cloud Point Improvement, ° F. |  | 50 | 53 |
| Naphtha (IBP-300° F.), wt % | 1.67 | 2.27 | 2.26 |
| Jet (300-500° F.), wt % | 27.17 | 29.02 | 29.22 |
| Diesel (500+° F.), wt % | 71.16 | 68.71 | 68.52 |

As shown in Table 4, at a temperature of 630° F. (332° C.) and a total pressure of 600 psig (4.1 MPag), the dewaxing catalyst with the lower metals content produced roughly the same cloud point improvement of about 50° F. (27° C.) as the cloud point improvement for the higher metals content catalyst under the same conditions. The product yields for the two catalysts were also similar. However, the hydrogen consumption for the lower metal catalyst is lower by about 12% (50 scf/B). Thus, at lower pressures the benefit achieved in reduced hydrogen consumption can be greater.

Example 5

Table 5 compares the hydrogen consumption, cloud point improvement, product color, and amount of aromatics saturation for dewaxing processes performed at a pressure of about 270 psig (1.8 MPa) and a temperature of about 630° F. (332° C.). As in Examples 2-4, the improvement of cloud point for the two catalysts were similar, while the hydrogen consumption for the catalyst with only 0.3 wt % metal was ~25 SCF/B (4 m$^3$/m$^3$) lower than that for MIDW-5 catalyst. As shown in Table 5, at least part of the reduced hydrogen consumption was due to reduced aromatic saturation, as the aromatic content was about 1 wt % higher in the product from the 0.3 wt % metal dewaxing catalyst. A reduced amount of aromatic saturation could pose a concern for achieving the color specification for a diesel fuel. However, according to ASTM D-1500 test, the product colors were the same for the 0.3 wt % metal catalyst and the 0.6 wt % metal catalyst.

TABLE 5

Processing conditions and results for Example 5

|  | 0.3 wt % Pt on ZSM-48 | 0.6 wt % Pt on ZSM-48 |
|---|---|---|
| Temperature, ° F. | 630 | 630 |
| LHSV, hr$^{-1}$ | 3.0 | 3.0 |
| Pressure, psig | 270 | 270 |
| Treat Gas, SCF/B | 2000 | 2000 |
| H Consumption, SCF/B | 119 | 142 |
| Cloud Point Improvement, ° F. | 51 | 50 |
| Product Color by ASTM D1500 | L1.5 | L1.5 |
| Aromatics, B5253/QAL |  |  |
| Total | 29.0 | 27.9 |
| Mono | 22.6 | 21.6 |
| PNA | 6.4 | 6.3 |

Example 6

Table 6 shows the processing conditions and results for the dewaxing reaction performed in Example 6. As noted above, the sulfur content for the feedstock in sample 6 was increased to 400 wppm.

TABLE 6

Processing conditions and results for Example 6

|  | 0.3 wt % Pt on ZSM-48 | 0.6 wt % Pt on ZSM-48 |
|---|---|---|
| Temperature, F. | 630 | 630 |
| LHSV, hr$^{-1}$ | 3.0 | 3.0 |
| Pressure, psig | 1000 | 1000 |
| Treat Gas, SCF/B | 2000 | 2000 |
| H Consumption, SCF/B | 151 | 164 |
| Cloud Point Improvement, F. | 9 | 10 |
| Naphtha (IBP-300 F.), wt % | 1.9 | 1.9 |
| Jet (300-500 F.), wt % | 27.2 | 27.2 |
| Diesel (500+ F.), wt % | 70.9 | 71.0 |

As shown in Table 6, at a temperature of 630° F. (332° C.) and a total pressure of 1000 psig (4.1 MPag), the dewaxing catalyst with the lower metals content produced roughly the same cloud point improvement of about 10° F. (6° C.) as the cloud point improvement for the higher metals content catalyst under the same conditions. The product yields for the two catalysts were also similar. However, the hydrogen consumption for the lower metal catalyst is lower by about 8% (13 scf/B). It is noted that the overall hydrogen consumption is also reduced. The higher sulfur content of the feed appears to result in less hydrogen consumption, although the proportional amount of hydrogen reduction is similar to the other Examples that were performed at a pressure of 1000 psig (6.9 MPag).

Additional Embodiments

Embodiment 1. A method for producing distillate fuel products, comprising: exposing a distillate fuel boiling range feedstock to a dewaxing catalyst comprising a molecular sieve and a metal hydrogenation component under effective dewaxing conditions to produce a dewaxed effluent having a cloud point that is reduced relative to a cloud point of the feedstock by at least about 10° F., the dewaxing catalyst having an amount of metal hydrogenation component comprising about 0.05 wt % to about 0.35 wt % of a Group VIII noble metal, wherein an amount of cloud point reduction for the dewaxed effluent is within 10% of a cloud point reduction for an effluent formed when the feedstock is exposed, under the effective dewaxing conditions, to a dewaxing catalyst comprising the molecular sieve and at least about twice the amount of metal hydrogenation component.

Embodiment 2. The method of Embodiment 1, wherein the effective dewaxing conditions comprise a pressure of from about 200 psig (1.4 MPa) to about 1500 psig (10.4 MPa), a temperature of from about 500° F. (260° C.) to about 750° F. (399° C.), a hydrogen treat gas rate of about 500 scf/bbl (84 Nm$^3$/m$^3$) to about 4000 scf/bbl (674 Nm$^3$/m$^3$) or less, and a space velocity of from about 0.3 hr$^{-1}$ to about 5.0 hr$^{-1}$.

Embodiment 3. The method of any of the above embodiments, further comprising exposing the feedstock to a hydrotreating catalyst to form a hydrotreated effluent having a sulfur content of about 100 wppm or less, wherein exposing a distillate fuel boiling range feedstock to a dewaxing catalyst comprises exposing at least a portion of the hydrotreated effluent to the dewaxing catalyst.

Embodiment 4. The method of Embodiment 3, wherein the effective hydrotreating conditions comprise a pressure of from about 200 psig (1.4 MPa) to about 3000 psig (20.7 MPa), a temperature of from about 500° F. (260° C.) to about 800° F. (427° C.), a hydrogen treat gas rate of about 500 SCF/B (84 Nm$^3$/m$^3$) to about 10000 SCF/B (1685 Nm$^3$/m$^3$) and a space velocity of from about 0.3 hr$^{-1}$ to about 5.0 hr$^{-1}$.

Embodiment 5. The method of any of the above embodiments, wherein the metal hydrogenation component comprises Pt, Pd, or a combination thereof, and preferably comprises Pt.

Embodiment 6. The method of any of the above embodiments, wherein the dewaxing catalyst comprises about 0.30 wt % or less of the metal hydrogenation component.

Embodiment 7. The method of any of the above embodiments, wherein the molecular sieve comprises ZSM-48, ZSM-23, or a combination thereof.

Embodiment 8. The method of any of the above embodiments, wherein the molecular sieve comprises ZSM-48 with a silica to alumina ratio of about 70 to 1 to about 110 to 1.

Embodiment 9. The method of Embodiment 8, wherein the molecular sieve has a silica to alumina ratio of about 90 to 1 or less.

Embodiment 10. The method of any of the above embodiments, wherein the dewaxing catalyst further comprises a binder, preferably an alumina binder.

Embodiment 11. The method of Embodiment 10, wherein a surface area of the molecular sieve relative to a binder is less than about 80 to 100.

Embodiment 12. The method of any of the above embodiments, wherein the distillate fuel boiling range feedstock has a T5 boiling point of at least about 300° F. (149° C.) and a T95 boiling point of about 800° F. (371° C.) or less.

Embodiment 13. The method of any of the above embodiments, wherein the feedstock has a sulfur content of about 500 wppm or less and preferably about 100 wppm or less, a nitrogen content of about 100 wppm or less and preferably about 50 wppm or less, or a combination thereof.

Embodiment 14. The method of any of the above embodiments, further comprising exposing the dewaxed effluent to a hydrofinishing catalyst under effective hydrofinishing conditions.

Embodiment 15. The method of any of the above embodiments, wherein the feedstock has an aromatics content of at least about 3 wt %, and wherein an amount of hydrogen consumed during exposing the feedstock to the dewaxing catalyst is at least about 5% lower than an amount of hydrogen consumed for an effluent formed when the feedstock is exposed, under the effective dewaxing conditions, to a dewaxing catalyst comprising the molecular sieve and at least about twice the amount of metal hydrogenation component.

What is claimed is:

1. A method for producing distillate fuel products, comprising:

exposing a distillate fuel boiling range feedstock having a T95 boiling point of about 650° F. (343° C.) to about 800° F. (427° C.) to a dewaxing catalyst comprising a molecular sieve, wherein the molecular sieve comprises ZSM-48 with a silica to alumina ratio of about 70 to 1 to about 110 to 1, and a metal hydrogenation component under effective dewaxing conditions to produce a dewaxed effluent having a cloud point that is reduced relative to a cloud point of the feedstock by at least about 10° F., the dewaxing catalyst having an amount of metal hydrogenation component comprising about 0.05 wt % to about 0.35 wt % of a Group VIII noble metal, wherein the feedstock has a sulfur content of about 500 wppm or less, wherein an amount of cloud point reduction for the dewaxed effluent is within 10% of a cloud point reduction for an effluent formed when the feedstock is exposed, under the effective dewaxing conditions, to a dewaxing catalyst comprising the molecular sieve and at least about twice the amount of metal hydrogenation component, and wherein an amount of hydrogen consumed during exposing the feedstock to the dewaxing catalyst is at least about 7.5% lower than an amount of hydrogen consumed for an effluent formed when the feedstock is exposed, under the effective dewaxing conditions, to a dewaxing catalyst comprising the molecular sieve and at least about twice the amount of metal hydrogenation component.

2. The method of claim 1, wherein the effective dewaxing conditions comprise a pressure of from about 200 psig (1.4 MPag) to about 1500 psig (10.4 MPag), a temperature of from about 500° F. (260° C.) to about 750° F. (399° C.), a hydrogen treat gas rate of about 500 scf/bbl (84 $Nm^3/m^3$) to about 4000 scf/bbl (674 $Nm^3/m^3$), and a space velocity of from about 0.3 $hr^{-1}$ to about 5.0 $hr^{-1}$.

3. The method of claim 1, further comprising exposing the feedstock to a hydrotreating catalyst to form a hydrotreated effluent having a sulfur content of about 100 wppm or less, wherein exposing a distillate fuel boiling range feedstock to a dewaxing catalyst comprises exposing at least a portion of the hydrotreated effluent to the dewaxing catalyst.

4. The method of claim 3, wherein the effective hydrotreating conditions comprise a pressure of from about 200 psig (1.4 MPa) to about 3000 psig (20.7 MPa), a temperature of from about 500° F. (260° C.) to about 800° F. (427° C.), a hydrogen treat gas rate of about 500 SCF/B (84 $Nm^3/m^3$) to about 10000 SCF/B (1685 $Nm^3/m^3$) and a space velocity of from about 0.3 $hr^{-1}$ to about 5.0 $hr^{-1}$.

5. The method of claim 1, wherein the metal hydrogenation component comprises Pt, Pd, or a combination thereof.

6. The method of claim 1, wherein the dewaxing catalyst comprises about 0.05 wt % to about 0.3 wt % of the metal hydrogenation component.

7. The method of claim 1, wherein the feedstock a nitrogen content of about 100 wppm or less.

8. The method of claim 1, further comprising exposing the dewaxed effluent to a hydrofinishing catalyst under effective hydrofinishing conditions.

9. The method of claim 1, wherein the feedstock has an aromatics content of at least about 3 wt %.

10. The method of claim 1, wherein the amount of Group VIII noble metal in the dewaxing catalyst is from about 0.10 wt % to about 0.30 wt %.

* * * * *